United States Patent Office 3,751,386
Patented Aug. 7, 1973

3,751,386
CATALYST FOR PURIFICATION OF
WASTE GASES
Edgar Koberstein, Alzenau, and Eduard Lakatos, Hurth-Hermulheim, Germany, assignors to Laporte Industries Limited, London, England, and Deutsche Gold- und Silber-Scheideanstalt, Frankfurt, Germany
No Drawing. Filed Apr. 13, 1971, Ser. No. 133,721
Claims priority, application Germany, Apr. 17, 1970,
P 20 18 378.2
Int. Cl. B01j 11/22
U.S. Cl. 252—465     21 Claims

ABSTRACT OF THE DISCLOSURE

Catalyst compositions are provided containing aluminium oxide and from 50% to 90% by weight of oxide of copper, chromium and nickel, which may optionally be doped with Group II–A metal compounds, the oxide of nickel amounting from 2% to 20% by weight of the catalyst. The catalysts are manufactured by mixing powdered calcined oxide of copper and chromium with aluminium oxide or aluminium oxide hydrate, forming catalyst granules from the mixture and then impregnating the granules with a nickel compound which on calcination will form the catalyst. The catalysts are used in the oxidative purification of waste gases particularly motor vehcile exhaust gases.

BACKGROUND OF THE INVENTION

This invention relates to oxidation catalysts for use in the purification of exhaust gases issuing from motor vehicle engines and from industrial plant, and to a process for preparing such catalysts.

Catalysts for use in the purification of such waste gases by assisting the oxidation of carbon monoxide and hydrocarbons to carbon dioxide and steam and removing nitric oxides should satisfy a number of process requirements some of which are apparently conflicting. Firstly oxidation should be initiated at as low a temperature as possible. Secondly oxidation should be efficient over a wide range of temperatures and gas throughputs. Thirdly oxidation activity should be retained over an extended period of operation. Fourthly the catalyst used should be mechanically strong so as to resist abrasion and other mechanical and thermal stresses. Lastly the oxidation efficiency should not be effected adversely by common catalyst poisons which may be present in the waste gas to be purified.

In the purification of motor vehicle exhaust gases, in particular, all of the above requirements are particularly exacting since the exhaust gases vary widely in temperature, composition and velocity and may contain appreciable quantities of compounds containing sulphur, phosphorus or lead, as a result of such impurities being unremoved from the fuel used or being purposely added to the fuel to adapt it for use in high compression engines.

When catalysts containing gamma aluminium oxide and large amounts of other oxides are manufactured by charging the aluminium oxide with the other metal oxides by impregnation with solutions of suitable compounds of the other metals followed by drying, the resulting catalysts are unsuitable for use in the purification of motor vehicle exhaust gases at high temperatures. This is thought to be due either to fast solid state reactions between the aluminium oxide and the other metal oxides at the high temperatures involved or due to low mechanical stability of the catalyst under the wide range of pressures and temperatures involved.

A catalyst was prepared by mixing gamma aluminium oxide with an aqueous solution containing 5.0 moles $BaCl_2$ per 100 moles $Al_2O_3$. The wet paste was dried and calcined for 16 hours at a temperature of 870° C. The stabilised aluminium oxide was thoroughly washed with water and on analysis was found to have a BaO content of 3.8% by weight.

The stabilised aluminium oxide was impregnated with 30.4% $Cr_2O_3$, added as a $CrO_3$ solution, and also with 20% CuO, by weight of the stabilised aluminium oxide. The impregnated aluminium oxide was dried and calcined at 650° C. for 6 hours.

The catalyst was submitted to tests under the regulations laid down by the "California Test Procedure and Criteria for Motor Vehicle Exhaust Emission Control Board" and the following results were obtained.

| Driving distance, km.: | Conversion of hydrocarbons after 4th deceleration, percent |
|---|---|
| 0 | 90 |
| 5000 | 77 |
| 10,000 | 70 |
| 20,000 | 37 |

Since the conversion of hydrocarbons had become quite unacceptable the test was then discontinued.

To illustrate the decomposition of a catalyst with increased amounts of heavy metal oxides under vehicle vibrations and pressure thrusts a further catalyst was prepared by impregnating gamma aluminium oxide tablets each 2 mm. in diameter and 3 mm. long with aqueous solutions of copper, chromium and nickel salts and by subsequent calcining up to a final temperature of 750° C. The catalyst contained aluminium oxide in a quantity of 40% by weight of the total oxides. The other oxides were present in the following proportions:

25% by weight of CuO
25% by weight of $Cr_2O_3$ and
10% by weight of NiO.

The average crushing strength of the impregnated tablets was less than 1 kg. compared with 10–13 kg. for the original pellets.

The present invention is particularly concerned with catalysts which comprise η-γ-aluminium oxide, chromium oxide, copper oxide and nickel oxide, the aluminium oxide being present in less than 50% by weight of the total oxides. It can be seen from the above experiment that it is not possible to prepare such a catalyst having acceptable mechanical strength for use in the purification of motor vehicle exhaust gases by impregnation of an aluminium oxide base.

An alternative process for the manufacture of such catalyst is by mixing freshly precipitated aluminium oxide hydrate with finely divided oxides of copper, chromium and nickel followed by drying, moulding and calcining. Such catalysts are a considerable improvement on those manufactured by impregnation as can be seen from the crushing strength of 8.7 kg. given by the product of comparative Example 2 as described hereafter.

THE PRESENT INVENTION

It has now been found that catalysts having a still further improvement in the properties necessary for use of the catalyst in the purification of motor vehicle exhaust gases can be obtained.

The present invention provides a process for preparing a catalyst composition containing a calcined aluminium oxide selected from the group consisting of gamma aluminium oxide and eta aluminium oxide which process comprises the steps of separately producing aluminium oxide selected from the group consisting of gamma aluminium oxide, eta aluminium oxide and aluminium oxide hydrate and calcined powdered oxide of copper and chromium selected from the group consisting of copper oxide in admixture with chromium oxide and copper oxide combined with chromium oxide, mixing the aluminium oxide and the calcined oxide of copper and chromium, calcining the mixture, impregnating the calcined mixture with an aqueous nickel salt solution, and calcining the impregnated mixture at a temperature of at least 700° C. to form the catalyst, the catalyst composition containing from 50% to 90% by weight of oxides of copper, chromium and nickel and from 2% to 20% by weight of nickel oxide calculated as NiO.

Where the oxide of copper and chromium is copper oxide combined with chromium oxide it may suitably be selected from the group consisting of copper chromite, copper chromium spinel and transition structures between copper chromite and copper chromium spinel. Preferably the oxide of copper and chromium is prepared by precipitation from an aqueous solution containing salts of copper and chromium. It is preferred to incorporate a quantity of a compound of Group II–A of the Periodic Table in the catalyst. Very suitably the compound is selected from the group consisting of oxide chromate and chromite of a metal selected from the group consisting of beryllium, magnesium, calcium, strontium and barium and is incorporated in the catalyst by doping the oxide of copper and chromium with the compound before admixture with the aluminium oxide.

Preferably from 0.5% to 10% by weight of the Group II–A compound is used based on the weight of the oxide of copper and chromium. Unless otherwise stated any stated quantity of the oxide of copper and chromium in the catalyst includes the quantity of Group II–A metal compound present if the oxide of copper and chromium has been doped with Group II–A compound. Such doping is preferably conducted by the joint alkaline precipitation of the oxide of copper and chromium and the Group II–A compound from an aqueous solution containing salts of copper and chromium and of the Group II–A metal. Preferably the molar ratio of CuO to $Cr_2O_3$ is from 1.2:1 to 2.2:1. Preferably the molar ratio of Group II–A element, calculated as the oxide, to $Cr_2O_3$ is from 0.01 to 0.1:1.

It has been found that a large surface area, such as is possessed by many catalysts of the type in which an alumina carrier is impregnated with copper chromium oxide, is a disadvantage where the catalyst is to be used in the purification of motor vehicle exhaust gases since catalyst poisons such as lead compounds, present in the exhaust gases are adsorbed more readily onto the catalyst. Catalysts in which the copper chrome oxide particles are small, for example below 1000 A. or even below 500 A., tend to be readily deactivated by high temperatures and also tend to be readily abraded.

In an experiment copper chrome oxide was formed by precipitation from an aqueous solution containing a mixture of salts of copper and chromium by the addition of alkali with subsequent calcination of the resulting precipitate. The calcined particles having a particle size of from 500° A. to 1000 A. were mixed with gamma aluminium oxide and formed into granules and calcined. The molar ratio of CuO to $Cr_2O_3$ was 1.5:1 and the weight ratio of oxide of copper and chromium to aluminium oxide was 7:3. This catalyst was found to lose almost all of its activity in the oxidation of carbon monoxide and hydrocarbons on calcination at 1000° C. for a brief period of time. Such temperatures commonly occur in motor vehicle exhaust gases. Under controlled conditions a corresponding catalyst which had been calcined at 600° C. oxidised 94% of the carbon monoxide and 29% of the hydrocarbons in an exhaust stream while the catalyst calcined to 1000° C. could oxidise only 22% of the carbon monoxide and had no effect at all in oxidising hydrocarbons.

Preferably therefore the catalyst according to this invention incorporates oxides of copper and chromium having a particle size of at least 1000 A. for example of from 0.5 to 5.0 microns. Preferably the aluminium oxide has a similar particle size.

After the aluminium oxide and the calcined oxide of copper and chromium have been mixed the mixture is preferably dried, peptised with acid and moulded before calcination. The quantity of acid may be from 5 to 100 ml. preferably 20–50 ml. per kg. of dried mixture where a concentrated mineral acid is used and from 50 to 300 ml. preferably 80–120 ml. per kg. of dried mixture where a concentrated aliphatic carboxylic acid is used. Preferably the acid is selected from the group consisting of hydrochloric acid, nitric acid, sulphuric acid, acetic acid, propionic acid, citric acid and lactic acid. Concentrated mineral acid means usual commercial saturated aqueous acid solution (f.i. 38% HCl, 98% $H_2SO_4$). Concentrated aliphatic carboxylic acid means the pure liquid acid (f.i. glacial acetic acid) or in case of solid acids (f.i. citric acid) a saturated aqueous solution thereof. The peptisation may be conducted at a temperature of about 100–140° C. over a period of about 8–16 hours. The quantity of nickel oxide included in the catalysts of this invention may vary from 2% to 20% by weight, calculated as NiO, based on the weight of the entire nickel containing catalyst. Preferably the nickel oxide is present in from 6% to 10% by weight of the entire catalyst.

Particularly suitably the catalyst contains from 60% to 70% by weight of oxide of copper and chromium. It has been found that oxides containing aluminium oxide and a major proportion of oxides of copper and chromium have a good life expectancy in the purification of motor vehicle exhaust gases up to a quantity of about 70% w./w. of oxides of copper and chromium. Higher quantities of oxides of copper and chromium can cause a decrease in the mechanical strength of the catalyst. Surprisingly catalysts containing about 60% to 70% of oxides of copper and chromium may be impregnated with nickel oxide, thus raising the total heavy metal oxide content of the catalyst to well above 70% by weight and unexpectedly obtaining a further improvement in mechanical strength and stability.

The mixture of aluminium oxide and oxide of copper and chromium is preferably calcined at a temperature below 700° C. for example 450° C. to 550° C. for from 1½ to 2½ hours. The nickel oxide impregnated catalyst is preferably calcined in two stages after drying to remove liquid. The first stage is preferably at a temperature of from 300° C. to 700° C. for example 450° C. and the second stage, the calcination proper, at from 700° C. to 1000° C. for example 800° C. The second stage calcination is preferably conducted for from 1½ to 2½ hours.

A catalyst composition, for use in the oxidation of waste gases which catalyst composition comprises moulded bodies each of which comprise a homogeneous mixture of an aluminium oxide selected from the group consisting of gamma aluminium oxide and eta aluminium oxide, with an oxide of copper and chromium selected from the group consisting of copper oxide in admixture with chromium oxide and copper oxide combined with chromium oxide the mixture being impregnated with nickel oxide and containing from 50% to 90% by weight of oxides of copper, chromium and nickel and from 2% to 20% by weight of nickel calculated as NiO, is also provided by the invention.

Preferred catalysts according to the invention use oxide of copper and chromium doped with 0.5 to 10.0% w./w. of a Group II–A compound as disclosed above. Preferably the particle size of the oxide of copper and chromium is from 0.5 to 5.0 microns. Preferably the catalyst contains from 60% to 70% by weight of the oxide of copper and chromium, in a molar CuO to $Cr_2O_3$ ratio of from 1.2:1 to 2.2:1 and from 6% to 10% by weight of the entire catalyst of nickel calculated as NiO.

The invention also provides processes for the purification of waste gases containing for example carbon mosoxide, hydrocarbons and nitric oxides, using the nickel containing catalysts according to the invention. Preferably additional air is supplied.

The invention will now be illustrated by means of Examples 1–3 which describe the manufacture of catalysts prepared according to the invention and Example 4 which compares the properties of catalysts prepared according to the invention with comparative Catalysts 1 and 2 prepared by processes not according to the invention.

Comparison Catalyst 1

These were the "MIX" mouldings not impregnated with nickel produced as described in Example 1.

Comparison Catalyst 2

A precipitate of nickel chromium oxide was made by coprecipitation from an ammonia containing solution of ammonium chromate, nickel nitrate and barium nitrate. This precipitate contained, based on its dry weight, 6 weight percent of Ba, calculated as BaO. The precipitate was separated from the liquid by suction filtration and dried for 10 hours in air at a temperature of 120–130° C. The dried precipitate was crushed and calcined for 1 hour at temperatures of from 350–400° C. in a muffle oven. A precipitate of barium-treated copper chromium oxide was made by coprecipitation from an ammonia containing solution of ammonium chromate, copper nitrate and barium nitrate. This precipitate contained based on its dry weight, 6 weight percent of Ba, calculated as BaO. The precipitate was separated from the liquid by suction filtration and dried in air for 10 hours at a temperature of 130° C. The dried precipitate was crushed and calcined for 1 hour at a temperature of 400° C. in a muffle oven. 8 kg. of the nickel chromium oxide and 8 kg. of the copper chromium oxide were kneaded for 3 hours with 100 kg. of a fresh precipitated aluminium hydroxide press cake (6.7 weight percent $Al_2O_3$) in a kneader. The kneaded mixture was dried for 12 hours in a chamber oven at 110° C. The dried material was crushed and ground on a disc mill to maximum particle size of 100 microns. The ground powder was peptised in a kneader and graphite and water added and the mass kneaded until it was suitable for pressing. The mass was then pressed into extrudates of 2 mm. diameter with extruder and then calcined in oxygen atmosphere at 800° C.

EXAMPLE 1

Catalysts according to the invention were manufactured as follows:

An aqueous solution of ammonium chromate, copper nitrate and barium nitrate was precipitated by adding ammonia. The resulting deposit of basic, barium doped copper chromate contained 6% barium calculated as BaO in relation to the dried precipitate, and oxides of copper chromium and barium in a molar ratio $$2CuO:1Cr_2O_3:0.08BaO$$

The precipitate was separated off from the liquid in a suction filter, dried in a dryer in air for a total of 10 hours at 120–130° C., subsequently comminuted and heated in this form for an hour at 350° C. to 400° C. in a muffle furnace. The powdery material resulting was then ground to a particle size of approximately 60 microns. Electron microscopy showed that the particle size of the bulk of the material was from 0.5 to 5.0 microns.

100 kg. of an aluminium oxide presscake with a solid content of 6.7 kg. $Al_2O_3$, which was prepared by precipitation of an aluminium sulphate solution with soda lye, subsequent washing and pressing out in a filter press, was mixed for 3 hours and homogenized in a kneader with 16 kg. of the barium doped oxides of copper and chromium (molar ratio $2CuO:1Cr_2O_3:0.08BaO$). The slurry was dried for 12 hours in a chamber oven on hurdles at 120° C. and subsequently ground on a disc mill to a grain size below 100 microns. This product is referred to as "MIX" hereafter.

1.6 kg. of "MIX" was processed with 54 ml. concentrated nitric acid (density 1.3), 60 g. stearic acid and 580 ml. water in an edge mill to a mouldable mass and moulded in an extruder. Mouldings of various diameter in the range 1 to 4 mm. can be obtained according to the adjustment.

The extruded mouldings were dried overnight on hurdles at 120° C. in a chamber oven and afterwards treated for 2 hours in a tubular furnace by passing in air at a temperature increasing by 4°/min. until a temperature of 500° C. was reached. Heating was subsequently continued for 2 hours at 500° C. in a muffle furnace.

10 kg. "MIX" mouldings were treated with 3 l. aqueous nickel nitrate solution with mixing. Following absorption of the liquid into the pores the mouldings were dried in a drying oven at 120° C., and then pre-calcined in the tubular furnace still at 450° C. The mouldings were then calcined for 2 hours at 800° C. in a muffle furnace.

By using aqueous nickel nitrate solutions having the concentrations shown in the following table the "MIX" mouldings impregnated with from 2 to 20% NiO were produced.

TABLE I

| Catalyst number | Gram $Ni(NO_3)_2 6H_2O$/ 3 l. aqueous solution | Percent NiO by weight of catalyst |
| --- | --- | --- |
| 1 | 775 | 2 |
| 2 | 1,550 | 4 |
| 3 | 2,325 | 6 |
| 4 | 3,100 | 8 |
| 5 | 6,200 | 16 |
| 6 | 7,800 | 20 |

EXAMPLE 2

The product designated "MIX" was prepared as in Example 1. 1.6 kg. of "MIX" were then treated with 143 ml. glacial acetic acid i.e., concentrated acetic acid, 64 g. graphite and 520 ml. water to form a mouldable mass. The mass was then moulded in an extruder set to produce 2 mm. diameter mouldings.

The moulded bodies were dried as in Example 1, tempered and impregnated with an aqueous solution of $Ni(NO_3)_2.6H_2O$, to give an NiO content of 8%. The resulting catalyst according to the invention is referred to as Catalyst No. 7.

EXAMPLE 3

7 kg. powdered BaO doped oxides of copper and chromium having a molar ratio of $CuO:Cr_2O_3:BaO=2:1:0.05$ were dried at 110° C., calcined at 400° C. and subsequently ground to a grain size of 60 microns.

Electron microscopy showed that the majority of the particles of the oxides of the copper and chromium had sizes in the range of from 0.5 to 5.0 microns.

The material was mixed with 3 kg. aluminium oxide (aluminium oxide powder HA600/S, Degussa commercial product) which had a similar particle size to the powdered oxides of copper and chromium, was peptised, sprayed with water, worked through a kneader, and dried at 120° C. The resulting cake was reduced in a Pfleiderer type sieve with a 1.5 mm. strainer to a grain size between 0.1 and 1.5 mm. 400 g. graphite was added as a moulding agent and moulding was conducted in a rotary pelleting machine. The moulded bodies were heated to 450 to 500° C. and then impregnated with an aqueous nickel nitrate solution and dried and calcined as in the process described in Example 1.

EXAMPLE 4

Catalysts 1 to 7 were tested for mechanical strength. The pressure resistance values are determined with a hydraulic measuring apparatus, by which the force necessary to crush an extruded moulding is measured. Several hundred moulded particles are crushed and the results obtained evaluated statistically.

To determine the abrasion 70 g. catalyst grains were agitated in a 300 ml. flask on a roll mill for 2 hours at 160 rotations/min. The catalyst sample was sieved on a standard set of sieves into the fractions 1000 to 300 microns, 300 to 75 microns and less than 75 microns and the percentage content of each based on the total weight of catalyst determined.

TABLE II

|  | Average crushing strength, kg. | Abrasion test | | | |
| --- | --- | --- | --- | --- | --- |
|  |  | $75\mu$, percent | $300$-$75\mu$, percent | $300$-$1,000\mu$, percent | Total percent |
| Catalyst number: |  |  |  |  |  |
| 1 (plus 2% NiO) impregnated | 12.2 | 0.06 | 0.17 | 0.19 | 0.42 |
| 2 (plus 4% NiO) impregnated | 13.1 | 0.04 | 0.13 | 0.11 | 0.38 |
| 3 (plus 6% NiO) impregnated | 13.5 | 0.04 | 0.07 | 0.08 | 0.19 |
| 4 (plus 8% NiO) impregnated | 14.5 | 0.02 | 0.03 | 0.03 | 0.08 |
| 5 (plus 16% NiO) impregnated | 10.1 | 0.06 | 0.25 | 0.22 | 0.53 |
| 6 (plus 20% NiO) impregnated | 10.2 | 0.06 | 0.09 | 0.11 | 0.26 |
| 7 (plus 8% NiO) impregnated | 14.2 | 0.02 | 0.02 | 0.04 | 0.08 |
| Comparison Catalyst 1 moulded body, not impregnated with Ni | 9.1 | 0.09 | 0.19 | 0.21 | 0.49 |
| Comparison Catalyst 2 mixed precipitation | 8.7 | 0.07 | 0.21 | 0.21 | 0.49 |

EXAMPLE 5

Catalyst No. 4 prepared according to Example 1 was connected in an appropriate catalyst container to the exhaust of a mass produced motor vehicle and tested in the street test according to the regulations of the "California Test Procedure and Criteria for Motor Vehicle Exhaust Emission." The motor vehicle was driven on a prescribed test course, which was planned to include town traffic, journeys on the main road and journeys on the motorway, and after 3000 kilometres the performance of the catalytic afterburning unit was measured on a rolling test stand adjusted according to the above regulations. The exhaust gases were continuously analysed, with the aid of infra-red instruments for hydrocarbons, carbonmonoxide and carbon dioxide. For further details in respect of these measurements reference is made to the quoted regulations. Strict adherence to these regulations is essential, as comparable data can only be obtained in this way. The results are summarized in Table III.

TABLE III

| Distance, km. | Hydrocarbon, p.p.m. | CO, percent |
| --- | --- | --- |
| 0 | 84 | 0.55 |
| 6,500 | 193 | 0.71 |
| 13,000 | 178 | 0.91 |
| 19,500 | 119 | 0.65 |
| 32,000 | 210 | 0.76 |
| 40,000 | 184 | 0.86 |
| 54,000 | 152 | 0.85 |

EXAMPLE 6

Catalyst No. 3 was inserted into catalytic purification units of various form and connected to the exhaust of a mass produced motor vehicle and tested in accordance with the dynamometer contained in the "California Test Procedure and Criteria for Motor Vehicle Exhaust Emissions" to test the effect of the catalyst in removing nitric oxides from exhaust gases. One form of purification unit consisted of a single catalyst bed and the second was divided into separate catalyst receivers. Additional air was added in the first case prior to the catalyst container and in the second case after the first catalyst bed.

The results were given in the following table.

TABLE IV

| Test conditions (1st catalyst container) | Initial $NO+NO_2$ content of gases (p.p.m.) | Final $NO+NO_2$ content of gases (p.p.m.) | Reduction (percent) |
| --- | --- | --- | --- |
| With secondary air | 1,694 | 1,003 | 41.0 |
| Without secondary air | 1,710 | 487 | 71.5 |

The hydrocarbon and carbon monoxide conversions correspond to those stated in Example 2.

EXAMPLE 7

A waste gas, which originated from an industrial chemical plant and contained ammonia and small amounts of mercapto compounds, caused marked irritation on account of unpleasant smell in the neighbourhood. On passing this waste gas over Catalyst No. 4 with a space velocity of 4.000 h.$^{-1}$, the temperature rose to 580° C. as a result of the combustion of ammonia. No smell could be detected in the gas escaping from the catalyst bed directly at the discharge aperture of the chimney.

What is claimed is:

1. A process for preparing a catalyst composition containing a calcined aluminium oxide selected from the group consisting of gamma aluminium oxide and eta aluminium oxide which process comprises the steps of separately producing aluminium oxide selected from the group consisting of gamma aluminium oxide, eta aluminium oxide and aluminium oxide hydrate and calcined powdered oxides of copper and chromium selected from the group consisting of copper oxide in admixture with chromium oxide and copper oxide combined with chromium oxide, mixing the aluminium oxide and the calcined oxides of copper and chromium, calcining the mixture, impregnating the calcined mixture with an aqueous nickel salt solution, and calcining the impregnated mixture at a temperature of at least 700° C. to form the catalyst, the catalyst composition containing from 50% to 90% by weight of oxides of copper, chromium and nickel and from 2% to 20% by weight of nickel oxide calculated as NiO.

2. A process as claimed in claim 1 wherein the oxide of copper and chromium is prepared by precipitation from an aqueous solution containing salts of copper and chromium.

3. A process as claimed in claim 1 wherein the mixture of aluminium oxide and calcined powdered oxide of copper and chromium is dried, is peptised with acid, and is moulded before it is calcined.

4. A process as claimed in claim 3 wherein the acid is selected from the group consisting of hydrochloric acid, nitric acid, sulphuric acid, acetic acid, propionic acid, citric acid, and lactic acid.

5. A process as claimed in claim 3 wherein the quantity of acid is equivalent to from 5–100 ml. of concentrated mineral acid, per kg. of dried mixture.

6. A process as claimed in claim 3 wherein the peptisation is conducted for a period of from 8 to 16 hours at a temperature of from 100 to 140° C.

7. A process as claimed in claim 3 wherein the quantity of acid is equivalent to from 50 to 300 ml. of concentrated aliphatic carboxylic acid per kg. of dried mixture.

8. A process as claimed in claim 1 wherein the catalyst contains from 60% to 70% by weight of the oxides of copper and chromium.

9. A process as claimed in claim 1 wherein the catalyst contains from 6% to 10% by weight of nickel calculated as NiO.

10. A process as claimed in claim 1 wherein the oxide of copper and chromium is doped with 0.5% to 10% by weight of a compound, selected from the group consisting of oxide, chromate and chromite of a metal selected from the group consisting of beryllium, magnesium, calcium, strontium and barium.

11. A process as claimed in claim 10 wherein the oxide of copper and chromium is doped by joint precipitation from an aqueous solution containing salts of copper and chromium and a compound of the metal selected with subsequent calcination of the precipitate.

12. A process as claimed in claim 1 wherein the oxide of copper and chromium and the mixture of the oxide of copper and chromium with the oxide of aluminium are each calcined at a temperature below 700° C.

13. A process as claimed in claim 1 wherein the impregnated mixture is calcined in two stages, the first stage at a temperature below 700° C. and in the presence of a stream of oxygen containing gas and the second stage temperature of from 700° C. to 1000° C.

14. A process as claimed in claim 13 wherein the subsequent calcination is conducted for from 1½ to 2½ hours.

15. A process as claimed in claim 1 wherein the particle size of the oxide of copper and chromium is from 0.5 to 5.0 microns.

16. A process as claimed in claim 1 wherein the particle size of the aluminium oxide is from 0.5 to 5.0 microns.

17. A process as claimed in claim 1 wherein the mole ratio of copper oxide to chromium oxide is from 1.2:1 to 2.2:1.

18. A process as claimed in claim 3, wherein the oxide of copper and chromium is doped with 0.5% to 10% by weight of a compound, selected from the group consisting of oxide, chromate and chromite of a metal selected from the group consisting of beryllium, magnesium, calcium, strontium and barium.

19. A process for preparing a catalyst composition containing a calcined aluminium oxide selected from the group consisting of gamma aluminium oxide and eta aluminium oxide which process comprises the steps of producing aluminium oxide selected from the group consisting of gamma aluminium oxide, eta aluminium oxide and aluminium oxide hydrate, precipitating an oxide of copper and chromium selected from the group consisting of copper oxide in admixture with chromium oxide and copper oxide combined with chromium oxide which oxide of copper and chromium form an aqueous solution containing salts of copper and chromium, and drying and calcining the oxides of copper and chromium, mixing the aluminium oxide and the calcined oxides of copper and chromium, peptising the mixture with acid, moulding the peptised mixture, calcining the mixture, impregnating the calcined mixture with an aqueous solution of a nickel salt and calcining the impregnated mixture at a temperature of at least 700° C., to form the catalyst, the catalyst composition containing from 50% to 90% by weight of oxides of copper chromium and nickel and from 2% to 20% by weight of nickel oxide calculated as NiO.

20. A process as claimed in claim 19 wherein the oxide of copper and chromium is doped with 0.5 to 10% by weight of a compound, selected from the group consisting of oxide, chromate, and chromite of a metal selected from the group consisting of beryllium, magnesium, calcium, strontium and barium.

21. A process as claimed in claim 20 wherein the oxide of copper and chromium is doped by joint precipitation from an aqueous solution containing salts of copper and chromium and a compound of the metal selected with subsequent calcination of the precipitate.

References Cited
UNITED STATES PATENTS 3,669,906   6/1972   Koberstein _____ 252—465

FOREIGN PATENTS 1,168,075   10/1969   Great Britain.

DANIEL E. WYMAN, Primary Examiner

W. J. SHINE, Assistant Examiner

U.S. Cl. X.R.

252—466 J; 423—213

UNITED STATES PATENT OFFICE
CERTIFICATE OF CORRECTION

Patent No. 3,751,386   Dated August 7, 1973

Inventor(s)  Edgar Koberstein and Eduard Lakatos

It is certified that error appears in the above-identified patent and that said Letters Patent are hereby corrected as shown below:

On the front page:

[73] Assignees:  Laporte Industries Limited,
London, England, and
Deutsche Gold-und Silber-
Scheideanstalt Vormals Roessler,
Frankfurt (Main), Germany Signed and sealed this 20th day of November 1973.

(SEAL)
Attest:

EDWARD M. FLETCHER, JR.  RENE D. TEGTMEYER
Attesting Officer  Acting Commissioner of Patents